United States Patent [19]
Perry

[11] Patent Number: 5,560,493
[45] Date of Patent: Oct. 1, 1996

[54] DIFFUSER FOR A MAGNETIC SEPARATOR

[75] Inventor: Rand R. Perry, Moraga, Calif.

[73] Assignee: Pacific Electric Motor Company, Oakland, Calif.

[21] Appl. No.: 403,454

[22] Filed: Mar. 14, 1995

[51] Int. Cl.$^6$ ................................................ B01D 35/06
[52] U.S. Cl. .................. 209/232; 210/222; 210/695; 209/223.1; 209/214
[58] Field of Search ................................. 209/636, 214, 209/925, 215, 223.1, 223.2, 231, 225, 232, 226, 39; 210/222, 223, 456, 695, 411

[56] References Cited

U.S. PATENT DOCUMENTS

| | | | |
|---|---|---|---|
| 3,627,678 | 12/1971 | Marston et al. | 210/222 X |
| 3,887,457 | 6/1975 | Marston et al. | 209/223.1 X |
| 4,033,864 | 7/1977 | Nolan et al. | 209/223.1 |
| 5,004,539 | 4/1991 | Golwell, Jr. | 209/223 X |

FOREIGN PATENT DOCUMENTS 118010  4/1992  Japan ...................... 210/222

Primary Examiner—Frank E. Werner
Attorney, Agent, or Firm—Townsend and Townsend and Crew LLP

[57] ABSTRACT

A magnetic separator (2) for separating magnetic particles from a passing slurry material comprises a canister (22) having a paramagnetic matrix element (24) disposed therein. Inlet and outlet manifold assemblies (30, 32) are disposed on either side of the canister for directing the slurry through the matrix element. Diffusers (60), positioned between the inlet and outlet manifold assemblies and the matrix element, comprise a hollow conical body (62) with a narrow inlet (64) facing the inlet manifold and an enlarged outlet (66) facing the matrix element. The diffusers define inner and outer flow passages for the slurry so as to distribute the slurry over a large portion of the paramagnetic matrix element, thereby avoiding localized saturation of the matrix element and increasing the on line time of the apparatus.

14 Claims, 3 Drawing Sheets

DIFFUSER FOR A MAGNETIC SEPARATOR

FIELD OF THE INVENTION

This invention relates to magnetic separators generally, and more specifically to a diffuser for distributing fluid flow over a magnetically conductive matrix structure within a magnetic separator to prevent localized saturation of the matrix structure.

BACKGROUND OF THE INVENTION

Large magnets are generally used for the separation of magnetic impurities from an aqueous slurry material, such as a dispersion of crude kaolin clay in water. Typically, these magnets comprise a large central canister containing a magnetically conductive matrix structure. The canister is placed in the center of a large magnet structure, such as a soft steel magnetic conducting core. Water cooled copper coils surround the canister to generate a high magnetic field, e.g., 20 kilogauss, within the matrix structure. Once the magnetic field is present, a slurry containing magnetic and nonmagnetic particles is run through the canister. The matrix structure collects the magnetic particles and the nonmagnetic particles exit the canister, where they are collected and discharged through an outlet manifold.

A significant drawback with existing magnetic separators is that the magnetically conductive matrix structure quickly becomes saturated with magnetic particles (typically after only about 10–15 minutes). When this occurs, flow of the product must be terminated and the magnetic field reduced to zero. When the field reaches zero, the magnetic particles collected in the matrix structure are backwashed to a pool where they can be safely accumulated and discarded. The device must then be restarted by regenerating the large magnetic field required for separating the magnetic particles. The time required to decay the magnetic field, backwash the matrix structure and then regenerate the field reduces the efficiency of the magnetic separator and increases the overall cost of the operation.

Unfortunately, the above described problem of saturation of the matrix element has been magnified by conventional methods of directing the flow of slurry through the magnetic separator. Typically, slurry is pumped through an inlet manifold and distributed to a number of individual pipes, which pass through the canister at individual conduits. The slurry then flows through the matrix structure and is discharged into a number of outlet pipes at the opposite end of the canister. One problem with this system is that the slurry generally passes directly through the matrix structure from inlet pipe to outlet pipe, thereby only coming into contact with localized portions of the matrix structure. These localized portions become quickly saturated, which reduces the period of time that the magnet is on line and capable of separating magnetic impurities from the product.

SUMMARY OF THE INVENTION

The present invention is directed to an apparatus and method for separating magnetic particles from a passing slurry. A magnetic separator comprises a canister having a paramagnetic matrix element disposed therein and bounded by upper and lower perforate plates for entry and exit of the slurry. Coils surround the canister for generating a magnetic field within the matrix element and inlet and outlet manifold assemblies are disposed on either side of the canister for directing slurry through the matrix element. The inlet manifold assembly includes a plurality of outlets communicating to an interstitial volume between the outlets and the lower perforate plate. To distribute the flow of slurry, diffusers are located in the interstitial volume between each inlet manifold outlet and the lower perforate plate. The diffusers comprise a hollow conical body with a narrow inlet and an enlarged outlet. The diffusers are fastened within the interstitial volume so as to define an inside flow path interior of the diffuser and an outside flow path exterior of the diffuser.

In a preferred configuration, the diffusers have a generally decreasing slope from the inlet to the outlet to form a bell-shaped outlet facing the lower perforate plate. The diffusers are spaced apart from the perforate plate to allow slurry flowing inside of the diffuser to pass between the diffuser and the perforate plate. In addition, the lower perforate plate includes a solid portion, such as a threaded bolt and washer, overlying the center of the diffuser to direct the fluid stream around this solid portion. The bolt and washer serves to block the most direct fluid path from the inlet manifold outlets to the matrix element, thereby facilitating distribution of the slurry.

One advantage of the present invention is that the diffusers distribute the slurry over a large section of the first perforate plate. This flow distribution forces the slurry to flow more evenly through the paramagnetic matrix element, thereby avoiding localized saturation of the matrix element. Thus, the overall duty cycle of the magnetic separator or the time the apparatus is on line and capable of separating magnetic impurities from nonmagnetic product is increased.

Other features and advantages of the invention will appear from the following description in which the preferred embodiment has been set forth in detail in conjunction with the accompanying drawings.

DESCRIPTION OF THE PREFERRED EMBODIMENTS

Figure 1:
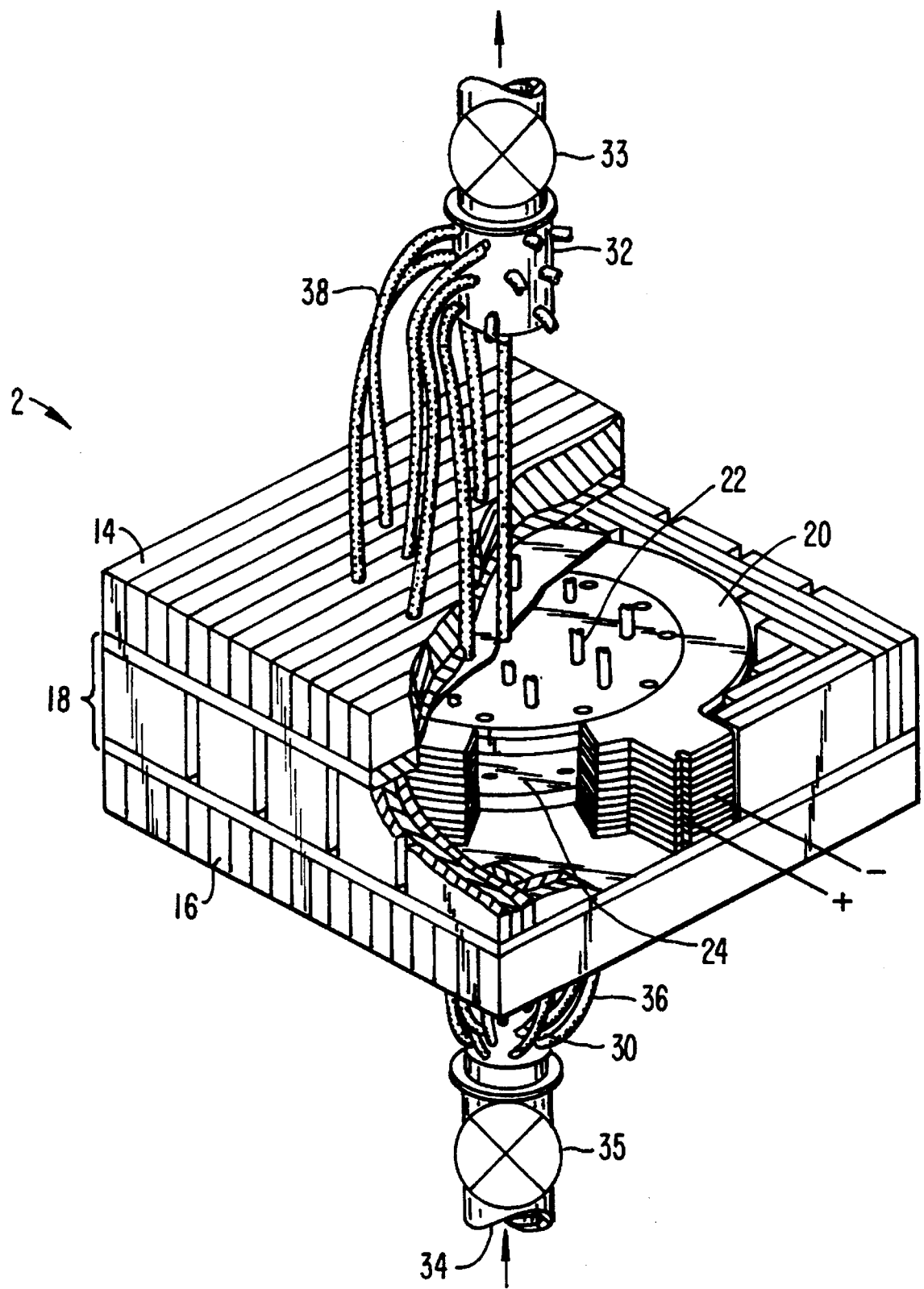
FIG. 1 is a perspective view of a magnetic separator that is partially cut-a-way to illustrate a canister filled with a paramagnetic matrix element.

Referring to the drawings in detail, wherein like numerals indicate like elements, a magnetic separator 2 is illustrated according to the principles of the present invention. Magnetic separator 2 preferably has a beam construction with a plurality of side-by-side top beams 14 and side-by-side bottom beams 16. Between the respective layers of top beams 14 and bottom beams 16, there is a beam core construction 18. Beam core construction 18 defines a generally cylindrical concavity that houses magnetic field generating coils 20 and a canister 22 for separating magnetic particles from an aqueous slurry containing magnetic and nonmagnetic particles, such as crude kaolin clay dispersed in water. It should be understood, however, that although magnetic separator 2 is shown and described with a particular construction, it is not intended to be limited in that manner. That is, apparatus 2 may be constructed with a variety of other configurations known in the art, such as plate type construction.

Beams 14, 16 are relatively large and sturdy, typically having a length of about 6–22 feet, a width of about 6–12 inches and a depth of about 12–36 inches, to resist the large, static magnetic field applied against these beams. In the preferred configuration, magnetic separator 2 will include 18 top beams and 18 bottom beams extending generally parallel to each other. The beams are constructed of soft, magnetic conducting steel, such as ASTM (American Society of Testing and Material Standard #) 1010 Steel.

Canister 22 is filled with a paramagnetic matrix element 24, such as stainless steel wool, for collecting magnetic particles from the slurry. The term "paramagnetic" refers to a substance that is generally nonmagnetic under normal circumstances. However, when placed under a magnetic field, the substance possesses magnetization in direct proportion to the strength of the field. A bottom manifold assembly 30 has an inlet 34 for receiving the slurry material and a plurality of inlet pipes 36 in fluid communication with inlet 34. Inlet pipes 36 extend out from bottom manifold assembly 30 and into the bottom of canister 22 to allow the slurry to pass into canister 22. A top manifold assembly 32 has a plurality of outlet pipes 38 that are generally aligned with inlet pipes 36 on the opposite or top side of the canister 22. After flowing through matrix element 24, the slurry is directed through outlet pipes 38 and collected in outlet manifold assembly 32.

As shown in FIG. 1, diverter valves 33, 35 are connected to outlet and inlet manifold assemblies 32, 30 for controlling fluid flow in either direction through canister 22 (for normal operation and backwashing, discussed below). It will be understood that the diverter valves shown here are a simplification of those utilized in a real installation. The valves are only shown here for the purpose of illustrating the operating principles of the disclosure.

Magnetic separator 2 further includes a power supply (not shown) for driving direct current through coils 20 to induce a magnetic field of approximately 10–50 kilogauss upon matrix element 24. The power supply will further include means for decelerating the magnetic field to allow it to decay to zero after matrix element 24 has been saturated. A suitable power supply is described in commonly assigned U.S. Pat. No. 4,978,442 to Tillotson, III et al., the complete disclosure of which is incorporated herein by reference. Of course, it will be readily recognized by those skilled in the art that other known power supplies can be utilized with the present invention.

Figure 2:
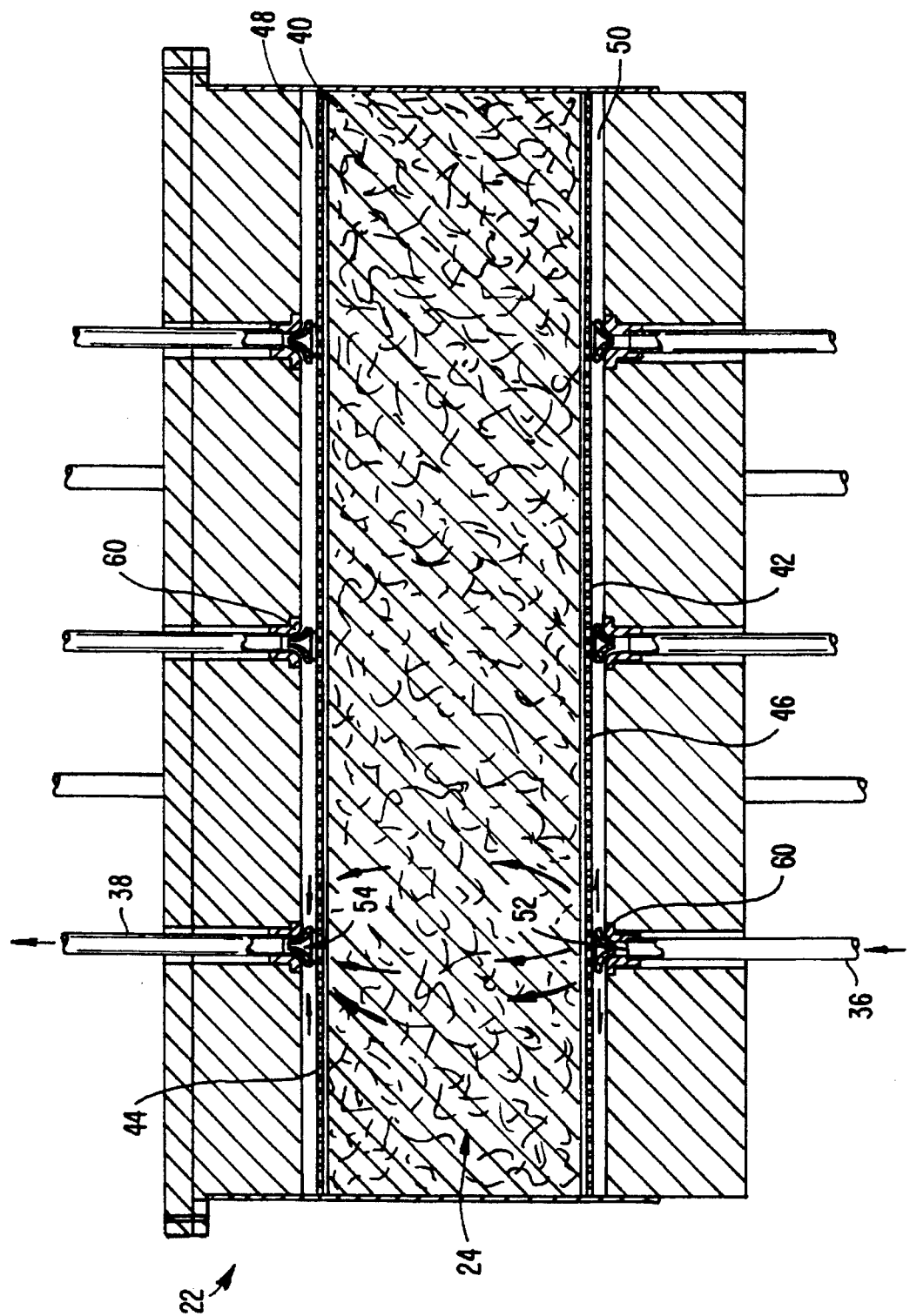
FIG. 2 is a cross-sectional view of the canister of FIG. 1 illustrating the flow of slurry through the magnetic matrix element according to the principles of the present invention.

FIG. 2 illustrates an enlarged cross-sectional view of the fluid flow through canister 22 according to the principles of the present invention. Matrix element 24 is housed in a chamber 40 within canister 22 and bounded on its lower and upper sides by perforate plates 42, 44, respectively. Upper and lower perforate plates 44, 42 include a plurality of holes 46 spaced from each other by about 0.25 to 0.5 inches to allow the slurry material to pass through matrix element 24. Matrix element 24 is mounted within canister 22 so as to define upper and lower spaces 48, 50 between the inner walls of canister 22 and perforate plates 42, 44. As shown in FIG. 2, inlet pipes 36 have openings 52 communicating with lower space 50 and outlet pipes 38 have openings 54 communicating with upper space 48. It should be noted that canister 22 may have one common outlet near the center of matrix structure 24, rather than the plurality of outlet pipes shown in FIG. 2.

To disperse the slurry flowing from inlet pipes 36 into lower space 50, diffusers 60 are positioned at openings 52 of each inlet pipe 36. In the preferred embodiment, diffusers 60 are also positioned at openings 54 of each outlet pipe 38 to improve cleaning when backwashing matrix element 24. Of course, magnetic separator 2 may be constructed with diffusers 60 in only the top or bottom of canister 22 depending on the flow direction of the slurry.

Figure 3:
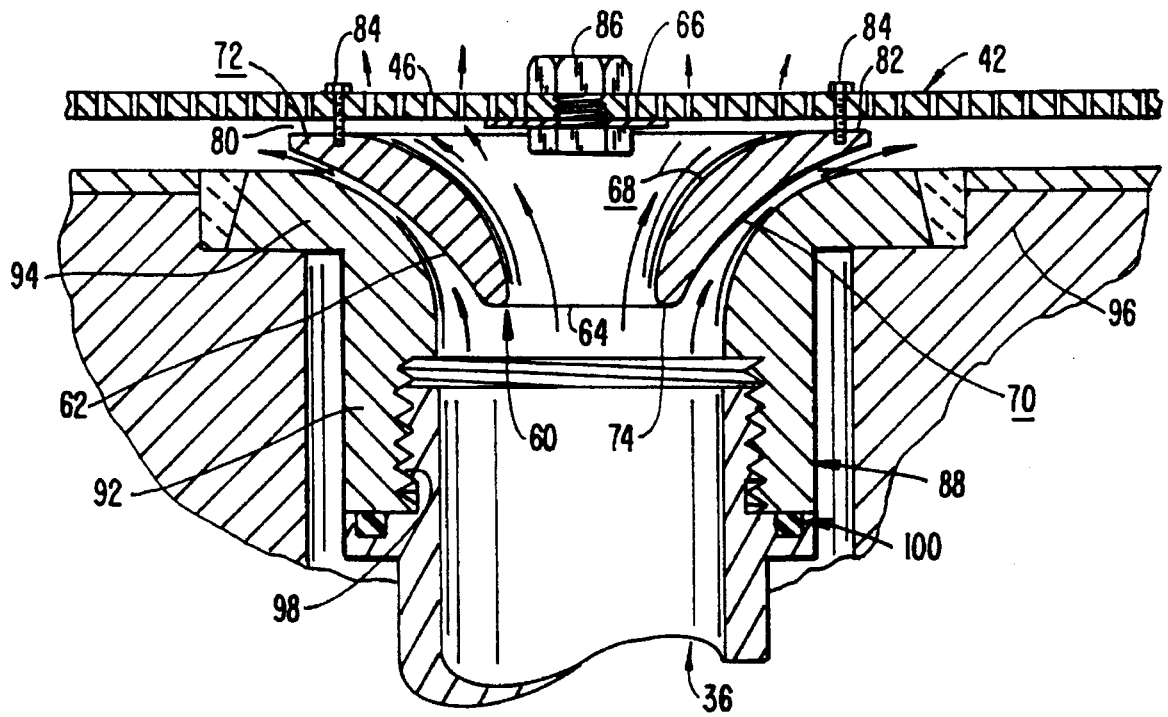
FIG. 3 is an enlarged view of a diffuser positioned near one of the inlets of the canister of FIG. 2.
Figure 4:
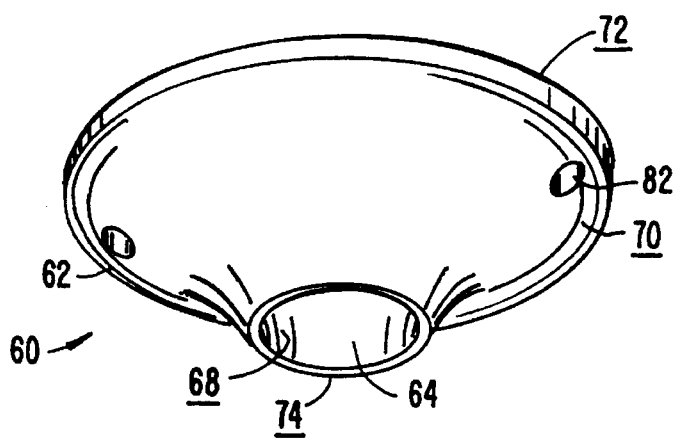
FIG. 4 is a perspective view of the diffuser of FIG. 3.

As best shown in FIGS. 3 and 4, diffusers 60 each comprise a hollow, generally conical body 62 with a relatively narrow inlet 64 facing inlet pipes 36 and an enlarged outlet 66 facing lower perforate plate 42. Inlet 64 preferably has a diameter of about 0.5 to 1.5 inches and outlet 66 has a diameter of about 3.0 to 4.5 inches. Body 62 defines inner and outer surfaces 68, 70 that have decreasing slopes from the lower portion to the upper portion of diffuser 60 so that diffuser 60 flares outward to form a generally bell-shaped outlet 66. In a preferred configuration, inner surface 68 decreases in slope at a faster rate than outer surface 70 so as to define an annular upper surface 72 extending around the upper portion of diffuser 60. Body 62 further includes a lower surface 74 extending around the lower portion of diffuser 60. Upper and lower surfaces 72, 74 are generally parallel to lower perforate plate 42 and are preferably about 0.75 to 1.25 inches apart from each other.

Diffusers 60 define an inside flow passage between enlarged outlet 66 and lower perforate plate 42 and an outside flow passage over the exterior of diffuser 60 to lower perforate plate 42. Diffusers 60 are mounted to lower perforate plate 42 so that they are spaced apart from the perforate plate, defining a gap 80 therebetween, preferably between about 0.125 to 0.75 inches wide. This allows slurry flowing along the inside flow passage to pass between upper surface 72 and lower perforate plate 42, as discussed in more detail below. In a preferred configuration, diffusers 60 includes a number of holes 82 in upper surface 72 for receiving fasteners 84, such as threaded bolts, screws, etc. Fasteners 84 attach upper surface 72 to lower perforate plate 42. Of course, those skilled in the art will recognize that diffusers 60 may be mounted within lower space 50 in a variety of different configurations, such as bolting the outer surface 70 of each diffuser 60 to fitting 88 or attaching the lower surface 74 to pipe 36.

The slurry will preferably flow through magnetic separator 2 at a relatively high fluid pressure, e.g., about 1–100 psi. At these fluid pressures, a substantial portion of the fluid stream will typically flow directly from the inlet pipe openings 54 through lower perforate plate 42 (i.e., the shortest path). Therefore, the regions directly above these outlets often become saturated before the rest of matrix element 24, which reduces the on line time of the apparatus. To prevent this from occurring, lower perforate plate 42 includes a solid portion, such as a bolt 86 and a washer (not shown), directly over the central axis of each diffuser 60. Bolt 86 serves to block direct flow of the slurry from diffuser outlet 66 through perforate plate 42, thereby distributing this flow over a larger portion of the plate. The bolt and washer together preferably have a diameter of about 0.25 to 0.75 inches so that the flow is diverted around an area of about 0.2 to 1.8 in$^2$. Of course, other means for diverting the slurry may be used, such as a conical projection extending downward from lower perforate plate 42. Alternatively, perforate plate 42 can be manufactured so that there is no opening or hole at each portion that directly overlies the central axis of each diffuser 60.

Canister 22 includes a plurality of fittings 88 for attaching inlet and outlet pipes 36, 38 to canister 22. As shown in FIG. 3, fittings 88 preferably have an annular body with a cylindrical portion 92 for attachment to pipes 36, 38 and a tapered portion 94 that opens into spaces 48, 50. Cylindrical portion 92 preferably has an inner diameter of about 1.5 to 3 inches. Tapered portion 94 is fixed to a recessed section 96 of canister 22 in any suitable manner, e.g., by welding. Cylindrical portion 94 has inner threads 98 for threadably coupling one of the pipes 36, 38 to fitting 88. An elastomeric ring 100 provides a tight seal between fitting 88 and pipe 36. Diffusers 60 are positioned within lower space 50 so that an annular gap exists between outer surface 70 of diffusers 60 and tapered portion 94 of fitting 88. As shown in FIG. 3, the annular gap forms the outside flow passage exterior to diffuser 60, as discussed in more detail below.

In operation, coils 20 are energized by the power supply to establish a high intensity magnetic field within matrix element 24. An aqueous slurry containing magnetic and nonmagnetic particles is then supplied to bottom manifold assembly 30 via inlet 34 and distributed through inlet pipes 36. The slurry is directed through inlet pipes 36 and diffusers 60 into lower space 50, where it is distributed through holes 46 in lower perforate plate 42. Before the slurry passes through holes 46, diffusers 60 divide the fluid stream into a first portion that flows through the inside flow passage and a second portion that flows around diffusers 60 through the outside flow passage. The first portion of slurry is diverted around bolt 86 so that this portion is more evenly distributed over lower perforate plate 42. Some of the slurry within this portion may pass through gap 80 between upper surface 72 of diffuser 60 and perforate plate 42. The second portion of slurry flows outside of diffuser 60 between tapered portion 94 of fitting 88 and outer surface 70.

The slurry passes through matrix element 24 and the magnetizable impurity particles contained in the slurry are retained by magnetic attraction on the fibers of the matrix element 24. The slurry, which now substantially comprises nonmagnetic particles, then exits through holes 46 in upper perforate plate 44 into upper space 48, where it is collected and discharged through outlet pipes 38 and outlet manifold assembly 32 (shown in FIG. 1). Since the slurry flowing through each inlet pipe 36 has been distributed over a large area of lower perforate plate 42 by diffusers 60, the flow stream through matrix element 24 will be relatively uniform. This allows the fibers within matrix element 24 to collect the magnetic particles at a substantially equal rate, which increases the time required for the matrix element 24 to saturate (relative to a constant flow rate of slurry), thereby increasing the efficiency of magnetic separator 2.

Once matrix element 24 becomes saturated, further retention of magnetic particles is inhibited and cleaning of the slurry becomes reduced. Accordingly, the magnetic field is removed from around matrix element 24 by collapsing the field. A suitable method of collapsing the magnetic field is disclosed in U.S. Pat. No. 4,978,442, which has already been incorporated by reference. After the magnetic field has decayed to at or near zero, apparatus 2 is backwashed to remove the magnetic particles from matrix element 24, preferably by running water through the apparatus in the reverse direction (i.e., from top to bottom). Diffusers 60 improve the backwashing by distributing the backwash fluid throughout matrix element 24. At this point, the magnetic field may be regenerated so that the separation process can continue.

The above is a detailed description of various embodiments of the invention. It is recognized that departures from the disclosed embodiments may be made within the scope of the invention and obvious modifications will occur to a person skilled in the art. For example, although the preferred embodiment does not describe a magnet with so-called super conducting capabilities, this should not exclude the applicability of this disclosure to these magnets. In addition, it should be apparent that while the inlet and outlet manifolds have been illustrated as being at the lower and upper ends of the canister, respectively, these openings may be reversed so that the slurry flows in the opposite direction through the separator.

What is claimed is:

1. An improvement to a magnetic separator for separating magnetic particles from a passing slurry containing magnetic and nonmagnetic particles, the magnetic separator comprising:

an electro-magnet having a central cavity with magnetic field generating coils surrounding the central cavity for generation of a magnetic field within the cavity, a canister housed within the central cavity having a paramagnetic matrix element disposed therein, the canister being bounded by enclosed sides with a first perforate plate for permitting entry of slurry and a second perforate plate for allowing exit of slurry, an inlet manifold assembly having an inlet for receiving the slurry and a plurality of outlets communicating to an interstitial volume between the outlets and the first perforate plate, the outlets communicating at spaced apart locations on the first perforate plate, an outlet manifold assembly having at least one inlet for receiving the slurry from the second perforate plate and at least one outlet for discharging the slurry, the improvement comprising:

diffusers located in the interstitial volume between the outlets of the inlet manifold and the first perforate plate, each diffuser comprising a hollow conical body with a relatively narrow diffuser inlet and an enlarged diffuser outlet to define an inside flow path interior of the diffuser and an outside flow path exterior of the diffuser; and means for fastening the diffuser in the interstitial volume between one of the outlets of the inlet manifold assembly and the first perforate plate with the narrow diffuser inlet disposed to one of the inlet manifold outlets and the enlarged outlet disposed to the first perforate plate.

2. The improvement to the magnetic separator according to claim 1 wherein said fastening means holds the diffuser spaced apart from the first perforate plate so as to define an inside flow passage between the diffuser enlarged outlet and the first perforate plate and an outside flow passage over the exterior of the diffuser to the first perforate plate for slurry whereby the fluid stream is distributed over the first perforate plate.

3. The improvement to the magnetic separator according to claim 1 wherein the conical body of the diffuser has a central axis and the first perforate plate has a solid portion overlying said central axis so as to direct the fluid stream around said solid portion.

4. The improvement to the magnetic separator according to claim 1 wherein the conical body of the diffuser comprises a wall having a generally decreasing slope from the narrow diffuser inlet to the enlarged diffuser outlet.

5. The improvement to the magnetic separator according to claim 4 wherein the wall of the conical body defines an inner surface and an outer surface, the inner surface having a slope that decreases faster than a slope of the outer surface.

6. The improvement to the magnetic separator according to claim 4 wherein the wall has an outer portion that is generally parallel to the first perforate plate, the fastening means including at least two holes in said outer portion and at least two bolts extending through said holes for attaching the outer portion of the diffuser to the first perforate plate.

7. The improvement to the magnetic separator according to claim 1 wherein said inlet manifold assembly includes a plurality of pipes communicating between the inlet and the plurality of outlets, said diffusers being partially disposed within said pipes and extending therefrom through said outlets.

8. The improvement to the magnetic separator according to claim 7 wherein the pipes each have an inner surface with an outwardly tapering portion forming the outlet of the inlet manifold assembly, the diffusers each being positioned within the interstitial volume such that the outside flow path lies between the outwardly tapering portion of each pipe and the conical body of each diffuser.

9. The improvement to the magnetic separator according to claim 1 wherein the outlet assembly includes a plurality of inlets for receiving the slurry from the second perforate plate and at least one common outlet, the improvement further comprising outlet diffusers positioned between the inlets of the outlet manifold and the second perforate plate, each outlet diffuser comprising a hollow conical body with a relatively narrow diffuser outlet and an enlarged diffuser inlet to define an inside flow path interior of the outlet diffuser and an outside flow path exterior of the outlet diffuser.

10. The improvement to the magnetic separator of claim 9 further comprising means for connecting the outlet diffusers between the inlets of the outlet manifold assembly and the second perforate plate with the narrow diffuser outlet disposed to one of the outlet manifold inlets and the enlarged inlet disposed to the second perforate plate.

11. A magnetic separator for separating magnetic particles from a passing slurry containing magnetic and nonmagnetic particles, the magnetic separator comprising:

an electro-magnet having a central cavity with magnetic field generating coils surrounding the central cavity for generation of a magnetic field within the cavity;

a canister housed within the central cavity having a paramagnetic matrix element disposed therein, the canister being bounded by enclosed sides with a first perforate plate for permitting entry of slurry and a second perforate plate for allowing exit of slurry;

an inlet manifold assembly having an inlet for receiving the slurry and a plurality of outlets communicating with the outlets and the first perforate plate, the outlets communicating at spaced apart locations on the first perforate plate;

an outlet manifold assembly having a plurality of inlets for receiving the slurry from the second perforate plate and at least one common outlet;

a plurality of diffusers located between the outlets of the inlet manifold and the first perforate plate, each diffuser having a hollow conical body with a relatively narrow diffuser inlet and an enlarged diffuser outlet, the conical body tapering outward from the narrow diffuser inlet to the enlarged diffuser outlet, the diffusers each being fastened to the first perforate plate so as to define an inside flow path interior of the diffuser and an outside flow path between the diffuser and the respective outlet of the inlet manifold assembly.

12. A process for separating magnetic particles from a passing slurry containing magnetic and nonmagnetic particles comprising:

providing an electro-magnet having a central cavity and a canister housed within the central cavity having a paramagnetic matrix element disposed therein, the canister being bounded by first and second, opposing perforate plates;

generating a magnetic field within the central cavity with magnetic field generating coils surrounding the cavity;

supplying the slurry to an inlet manifold assembly having a plurality of outlets communicating to an interstitial volume between the outlets and the first perforate plate, the outlets communicating at spaced apart locations on the first perforate plate;

directing the slurry through the plurality of outlets of the inlet manifold and into diffusers located in the interstitial volume between the outlets and the first perforate plate, the diffusers each having a hollow conical body with a relatively narrow diffuser inlet and an enlarged diffuser outlet;

dividing the slurry into an inside flow path interior of the diffuser and an outside flow path exterior of the diffuser so as to distribute the slurry over the first perforate plate; and allowing the slurry to enter the paramagnetic matrix element through the first perforate plate and exit said matrix element through the second perforate plate, whereby at least a portion of the magnetic particles are separated from the slurry and a remaining portion of the slurry is discharged through an outlet manifold assembly.

13. The process of claim 12 further including the step of diverting the slurry that is flowing along the inside flow path of the diffuser around a solid portion in the first perforate plate, the solid portion overlying a central axis of the diffuser.

14. The process of claim 12 further comprising the step of directing the slurry into outlet diffusers located between inlets of the outlet manifold assembly and the second perforate plate, the outlet diffusers each having a hollow conical body with a relatively narrow diffuser outlet and an enlarged diffuser inlet.

* * * * *